United States Patent [19]

Louis et al.

[11] 3,959,017

[45] May 25, 1976

[54] ELECTRODE AND SPACER ASSEMBLY FOR A FUEL CELL AND FUEL CELL THEREWITH

[75] Inventors: Gerhard Louis, Hofheim; Harald Böhm, Glashutten, both of Germany

[73] Assignee: Licentia Patent-Verwaltungs-G.m.b.H., Frankfurt am Main, Germany

[22] Filed: Aug. 29, 1973

[21] Appl. No.: 392,520

[30] Foreign Application Priority Data

Sept. 1, 1972  Germany............................ 2243211

[52] U.S. Cl................................ 136/86 D; 136/145
[51] Int. Cl.²...................... H01M 8/02; H01M 2/18
[58] Field of Search ............. 136/86, 160, 143, 159, 136/145

[56] References Cited
UNITED STATES PATENTS

| | | | |
|---|---|---|---|
| 1,467,707 | 9/1923 | Cook | 136/159 |
| 2,175,523 | 10/1939 | Greger | 136/86 R |
| 2,681,377 | 6/1954 | Smithers | 136/143 |
| 2,930,829 | 3/1960 | Jacquier | 136/143 |
| 2,988,587 | 6/1961 | Haring | 136/143 UX |
| 3,012,087 | 12/1961 | Van Billiard et al. | 136/160 |
| 3,126,302 | 3/1964 | Drushella | 136/143 X |
| 3,226,260 | 12/1965 | Drengler | 136/143 X |
| 3,531,329 | 9/1970 | Selwitz | 136/86 D X |
| 3,645,796 | 2/1972 | Bohm et al. | 136/86 D |
| 3,650,839 | 3/1972 | Lang et al. | 136/86 R |
| 3,708,341 | 1/1973 | Biddick | 136/86 D |

*Primary Examiner*—Allen B. Curtis
*Attorney, Agent, or Firm*—Spencer & Kaye

[57] ABSTRACT

A cell including two oppositely disposed electrodes and an electrically insulating substance spacing the electrodes from one another and bonded to a polymer cemented one of the two electrodes, there being protrusion created channels between the electrodes for the flow of electrolyte between the electrodes.

9 Claims, 5 Drawing Figures

ELECTRODE AND SPACER ASSEMBLY FOR A FUEL CELL AND FUEL CELL THEREWITH

BACKGROUND OF THE INVENTION

The present invention relates to a polymer cemented, thin layer electrode for fuel cells, which electrode is provided with an inactive cover layer on its electrolyte side.

Polymer cemented, porous electrodes made of powdered metals and/or catalytically active electrically conductive powders, such as carbon or tungsten carbide, are known. See, for example, West German Offenlegungsschrift (Laid-Open Application) No. 1,571,750.

Such solid electrodes generally have an electrically conductive surface which will face the electrolyte when they have been built into cells. Care must be taken that anodes and cathodes of this type do not come into contact in cells built of them. Otherwise, an electron loss current will arise. It has been in recognition of this problem that various separator elements have been used in storage batteries.

In fuel cells, in which the electrolyte must circulate in order to regulate the heat, the one type of storage battery separator which has been found practical has been the pierced and corrugated separator. The other types of separators present too much resistance to electrolyte flow.

A disadvantge in the use of these corrugated separators in fuel cells is their significant overall thickness, as compared to cell thickness, and the large volume of electrolyte and weight dictated by their thickness.

For fuel cell electrodes made of loose catalyst powder, it is known to contain the powder by pressing it in layer form with a finely porous cover layer, for example asbestos paper. See West German Offenlegungsschrift (Laid-Open Application) No. 1,930,035. This cover layer absorbs the electrolyte, and a free space for a flow of electrolyte for cooling purposes is completely lacking.

SUMMARY OF THE INVENTION

It is an object of the present invention to provide a solid electrode structure with which it is possible to realize a very narrow electrolyte space between the electrodes of a cell while making possible electrolyte flow between the electrodes without a need for a separate separator element.

This as well as other objects which will become apparent in the discussion that follows are achieved, according to the present invention, by a cell including two oppositely disposed electrodes and an electrically insulating substance spacing the electrodes from one another and bonded to a polymer cemented one of the two electrodes, there being protrusion created channels between the electrodes for the flow of electrolyte between the electrodes.

GENERAL ASPECTS OF THE INVENTION

In general, the spacing is obtained by an electrically insulating, inactive cover layer sintered onto the surface of one of the electrodes. At least the electrode to which the layer is sintered is a polymer cemented, thin layer type electrode. The channels are formed by protrusions on the electrolyte chamber side of the other electrode or by protrusions on the said one of the electrodes created by the cover layer or by electrode surface protrusions underlying the cover layer. These protrusions form channels for the free flow of electrolyte between the electrodes.

"inactive" as used herein indicates that the material in question fails to exhibit any catalytic action on either of the half reactions of the cell. "free" as used in "free flow of electrolyte" indicates a flow resistance much less than it would occur through a porous material, there by affording channel flow cross sections of at least 0.3 mm minimum size. "thick layer" in reference to a class of electrodes indicates a thickness less than 1 mm.

DESCRIPTION OF THE PREFERRED EMBODIMENTS

Figure 1:
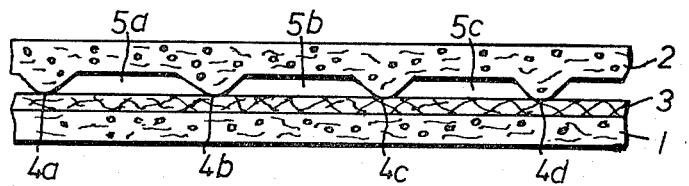
FIG. 1 is a broken away, cross-sectional view of the two electrodes of a cell according to the present invention.

FIG. 1 shows two oppositely disposed electrodes 1 and 2, and a porous, electrically insulating layer 3 sintered to the electrode 1. The electrode 2 is provided with protrusions 4a, 4b, 4c, 4d on its surface facing the electrolyte chamber area between electrodes 1 and 2, so that channels 5a, 5b, 5c result for the free flow of electrolyte. Electrode 1 is a polymer cemented electrode, e.g. it is made of powdered material, such as tungsten carbide, with the tungsten carbide powder particles being cemented together by polymer powder particles, such as polytetrafluoroethylene powder particles. For example, powder particles in the ratio 100 grams of tungsten carbide with a particle size of about 0.5 microns per 10 grams of polytetrafluoroethylene powder particles with a particle size of about 0.1 microns can be mixed together and hot pressed at a pressure of 0.3 metric tons per square centimeter for a short time at 360°C, until a porous, solid electrode of tungsten carbide particles cemented together by polytetrafluoroethylene is obtained. Electrode 2 may also be polymer cemented, for example it may be made of activated carbon particles bonded together by polytetrafluoroethylene powder particles.

Figure 2:
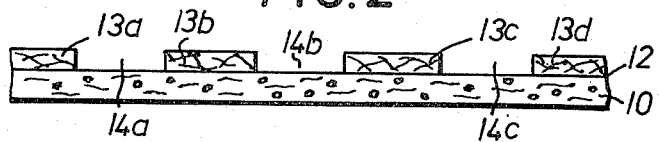
FIGS. 2 and 3 are broken away cross-sectional views of electrodes according to the present invention.
Figure 3:
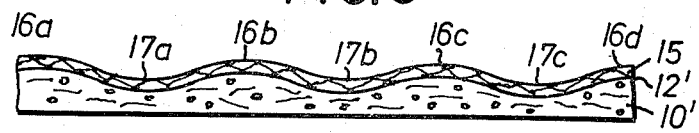

Proceeding now to FIG. 2, the sheet-shaped electrode 10 there is a polymer cemented catalyst material. Porous, electrically insulating, mutually spaced strips 13a, 13b, 13c, 13d are sintered onto electrode face 12, so that, firstly, the counterelectrode (not shown) in a cell will be electrically insulated from electrode 10 and, secondly, channels 14a, 14b, 14c will exist between electrode 10 and a counterelectrode for making possible a free electrolyte flow between the electrodes. Reference to U.S. Pat. No. 3,645,796, issued Feb. 29th, 1972, to Harald Böhm et al. for an "Electrochemical Cell Containing Electrical Contact and Method of Using", and more particularly to the FIG. 3 of that patent, will make clear to those skilled in the art that the assembly, shown in the present FIG. 2, of electrode 10 and spacer strips 13a, 13b, 13c, 13d may be used by holding it against a counterelectrode in a manner such that the channels 14a, 14b, 14c between the mutually spaced strips 13a, 13b, 13c, 13d remain free for electrolyte circulation through the channels, circulating electrolyte (e.g. 2-normal $H_2SO_4$) through the channels, and electrolytically oxidizing a fuel (e.g. hydrogen gas) on either electrode 10 or the counterelectrode while electrolytically reducing an oxidizing agent (e.g. oxygen gas) on the other of the two electrodes in order to produce electrical energy.

The sheet-shaped electrode 10' of FIG. 3 again comprises active catalyst material. A cover layer 15 of porous, electrically insulating material is sintered to electrode face 12' and has been given a corrugated shape. The counterelectrode (not shown) will contact the protruding portions 16a, 16b, 16c, 16d of the cover layer 15. The troughs 17a, 17b, 17c of the corrugated surface are to provide channels between the two electrodes for a free flow of electrolyte. This assembly of electrode 10' and spacer layer 15 may be used too along the lines indicated in the above-mentioned U.S. Pat. No. 3,645,796 by holdng it against a counterelectrode in a manner such that the troughs 17a, 17b, 17c remain free for electrolyte circulation through the troughs, circulating electrolyte through the troughs, and electrolytically oxidizing a fuel on either electrode 10' or the counterelectrode while electrolytically reducing an oxidizing agent on the other of the two electrodes in order to produce electrical energy.

The porous, electrically insulating substance forming the above-described layer 3, strips 13a, 13b, 13c, 13d, and layer 15 is wettable by the electrolyte and is advantageously a glass fiber fleece or an asbestos paper. A layer thickness of 0.5 millimeter is advantageous, with lesser thicknesses being achievable by using a sufficiently fine-pored substance to prevent a pressing of the electrode catalyst material through the pores.

Figure 4:
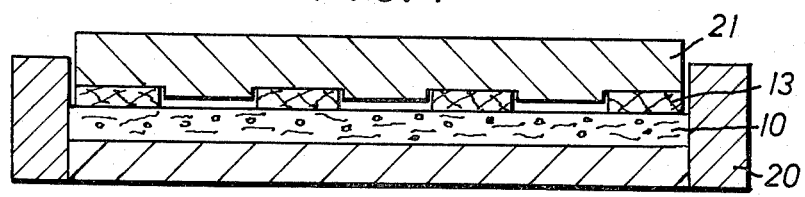
FIGS. 4 and 5 are schematic, cross-sectional views of apparatus actually engaged in making the electrodes of FIGS. 2 and 3, respectively.

Referring now to FIG. 4, there is shown a schematic representation of a pressing system for bonding strips 13a, 13b, 13c, 13d to catalyst material containing electrode 10. The electrode is placed into mold 20, and strips 13a, 13b, 13c, 13d of glass fleece are placed on the electrode. Mold 20 can be raised in temperature. A pressing die 21, with recesses corresponding to, but shallower than, the strips 13, presses strips 13a, 13b, 13c, 13d onto the electrode 10, so that the influence of heat and pressure can cause the strips to be sintered to electrode 10. Sintering can be accomplished, for example, using the thermoplastic island technique disclosed in the abovementioned U.S. Pat. No. 3,645,796, or by relying on the polymer already present in the electrode for cementing the catalyst particles together.

Figure 5:
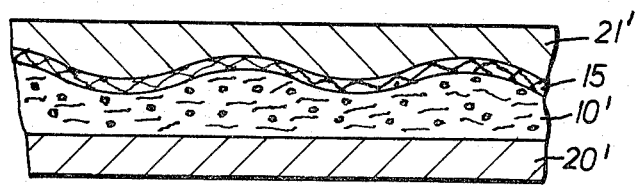

FIG. 5 illustrates how a mold 20' and corrugated pressing die 21' can be used to cause the cover layer 15 to bond and conform against the corrugated face of electrode 10'.

The advantages realized by the present invention are, for example, that with very thin electrodes of large expanse, as they are desired for, e.g., fuel cell applications, the bonding of the electrode to a fibrous, inactive, spacing material produces a substantial increase in resistance to tearing. The technique of the present invention can be used advantageously for both electrodes (anode, cathode) of a cell. Moreover, a dependable protection against short circuiting and the obtaining of proper electrode spacing may be realized, without substantially added effort, at the same time as the electrode itself is being sintered to create polymer cementing of catalyst particles. The separate separating elements provided in storage batteries are no longer required for assembly of cells according to the invention. This noticeably simplifies cell assembly.

It will be understood that the above description of the present invention is susceptible to various modifications, changes and adaptations and the same are intended to be comprehended within the meaning and range of equivalents of the appended claims.

We claim:

1. An electrode and spacer assembly for a fuel cell comprising a porous polymer cemented thin layer electrode sheet and porous, electrically insulating, mutually spaced strips bonded onto a face of the sheet, said strips serving as protrusions and forming channels for the free flow of electrolyte.

2. An electrode and spacer assembly for a fuel cell comprising a porous polymer cemented thin layer electrode sheet and a porous, corrugated, electrically insulating cover layer bonded onto a face of the sheet, the raised portion of the corrugations serving as protrusions and creating channels for the free flow of electrolyte.

3. A method of using an electrode and spacer assembly as claimed in claim 2, comprising holding it against a counterelectrode such that the troughs of the corrugated cover layer remain free for electrolyte circulation through the troughs, circulating electrolyte through the troughs, and electrolytically oxidizing a fuel on one of the electrode and counterelectrode while electrolytically reducing an oxidizing agent on the other of the electrode and counterelectrode to produce electrical energy.

4. A fuel cell comprising:
   a. a first thin layer polymer cemented fuel cell electrode having a porous, electrically insulating substance bonded to one of its sides; and
   b. a second fuel cell electrode facing the side of said first thin layer electrode to which the insulating substance is bonded and forming a space therewith, with one of said first and second electrodes having protrusions which contact the other of said electrodes and divide the space between the electrodes into channels for the free flow of electrolyte between the electrodes.

5. A method of using the fuel cell of claim 4 comprising circulating electrolyte through the channels, and electrolytically oxidizing a fuel on one of the electrodes while electrolytically reducing an oxidizing agent on the other of the electrodes to produce electrical energy.

6. The fuel cell of claim 4 wherein said protrusions are on said second electrode in the form of spaced, raised portions integral with the body of said second electrode.

7. The fuel according to claim 4 wherein said insulating substance is in the form of spaced strips and serve as the protrusions which create the channels between the electrodes.

8. The fuel cell according to claim 4 wherein said insulating substance is in the form of a corrugated cover layer, and the corrugations create the channels between the electrodes with the raised portion of the corrugations serving as the protrusions.

9. The fuel cell according to claim 4 wherein the insulating substance is sintered to the thin layer electrode.

* * * * *